United States Patent
Hong et al.

(10) Patent No.: US 10,485,042 B2
(45) Date of Patent: Nov. 19, 2019

(54) METHOD FOR RECONFIGURING WIRELESS BEARER AND DEVICE THEREOF

(71) Applicant: KT CORPORATION, Gyeonggi-do (KR)

(72) Inventors: Sung-pyo Hong, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/562,463

(22) PCT Filed: Mar. 29, 2016

(86) PCT No.: PCT/KR2016/003203
§ 371 (c)(1),
(2) Date: Sep. 28, 2017

(87) PCT Pub. No.: WO2016/159634
PCT Pub. Date: Oct. 6, 2016

(65) Prior Publication Data
US 2018/0092146 A1   Mar. 29, 2018

(30) Foreign Application Priority Data

Apr. 2, 2015  (KR) .................. 10-2015-0046974
Mar. 29, 2016  (KR) .................. 10-2016-0037352

(51) Int. Cl.
*H04W 76/15*   (2018.01)
*H04W 16/14*   (2009.01)
(Continued)

(52) U.S. Cl.
CPC ........... *H04W 76/15* (2018.02); *H04W 16/14* (2013.01); *H04W 36/0055* (2013.01);
(Continued)

(58) Field of Classification Search
CPC . H04W 16/14; H04W 28/02; H04W 36/0055; H04W 48/12; H04W 48/16;
(Continued)

(56) References Cited

U.S. PATENT DOCUMENTS

| | | | |
|---|---|---|---|
| 2009/0034476 A1* | 2/2009 | Wang | H04W 28/06 370/331 |
| 2009/0168723 A1* | 7/2009 | Meylan | H04L 1/1841 370/331 |

(Continued)

FOREIGN PATENT DOCUMENTS

| | | |
|---|---|---|
| WO | 2014/113686 A2 | 7/2014 |
| WO | 2015/020508 A1 | 2/2015 |

OTHER PUBLICATIONS

RAN3 (Contact: NEC), "Introduction of Dual Connectivity", R2-145424, 3GPP TSG-RAN WG2 Meeting #88, San Francisco, USA, Nov. 17-21, 2014, pp. 1-71.

(Continued)

*Primary Examiner* — Dung B Huynh
(74) *Attorney, Agent, or Firm* — IP Legal Services, LLC

(57) ABSTRACT

Provided are a method and a device for configuring or reconfiguring a wireless data bearer for transmitting user plane data. The method may include: receiving, from a base station, an upper layer signaling including information for changing a data wireless bearer type for a specific wireless bearer configured to receive downlink data by using only a WLAN wireless resource; performing a packet data convergence protocol (PDCP) data recovery procedure in a PDCP entity on the basis of the information for changing the data wireless bearer type for the specific wireless bearer; and performing a reordering procedure for the specific wireless bearer in the PDCP entity.

7 Claims, 8 Drawing Sheets

(51) Int. Cl.
*H04W 36/00* (2009.01)
*H04W 48/12* (2009.01)
*H04W 48/16* (2009.01)
*H04W 28/02* (2009.01)
*H04W 80/02* (2009.01)

(52) U.S. Cl.
CPC ........... *H04W 48/12* (2013.01); *H04W 48/16* (2013.01); *H04W 28/02* (2013.01); *H04W 80/02* (2013.01)

(58) Field of Classification Search
CPC ..... H04W 76/15; H04W 76/19; H04W 76/22; H04W 80/02
See application file for complete search history.

(56) References Cited

U.S. PATENT DOCUMENTS

| | | | | |
|---|---|---|---|---|
| 2009/0168724 | A1* | 7/2009 | Umesh | H04W 36/02 370/331 |
| 2009/0190554 | A1* | 7/2009 | Cho | H04L 1/1874 370/331 |
| 2009/0286541 | A1* | 11/2009 | Maheshwari | H04W 76/10 455/436 |
| 2010/0029280 | A1* | 2/2010 | Tenny | H04W 36/02 455/436 |
| 2012/0147869 | A1* | 6/2012 | Chhatriwala | H04W 28/065 370/338 |
| 2013/0088983 | A1* | 4/2013 | Pragada | H04W 16/14 370/252 |
| 2013/0268628 | A1* | 10/2013 | Zhu | H04W 52/04 709/217 |
| 2014/0050086 | A1* | 2/2014 | Himayat | H04N 21/2365 370/230 |
| 2014/0079022 | A1* | 3/2014 | Wang | H04W 36/22 370/331 |
| 2014/0213219 | A1* | 7/2014 | Mohebbi | H04W 92/02 455/411 |
| 2015/0071250 | A1* | 3/2015 | Dai | H04W 36/38 370/331 |
| 2015/0085667 | A1* | 3/2015 | Sivanesan | H04W 76/38 370/237 |
| 2015/0117357 | A1* | 4/2015 | Ozturk | H04W 28/0205 370/329 |
| 2015/0181459 | A1* | 6/2015 | Zhu | H04W 28/0289 370/236 |
| 2015/0181470 | A1* | 6/2015 | Chai | H04W 36/0005 455/438 |
| 2015/0181473 | A1* | 6/2015 | Horn | H04W 36/0027 370/331 |
| 2015/0189551 | A1* | 7/2015 | Ozturk | H04W 28/08 370/235 |
| 2015/0215987 | A1* | 7/2015 | Kim | H04L 47/34 370/329 |
| 2015/0264726 | A1* | 9/2015 | Zhu | H04W 28/065 370/329 |
| 2016/0021581 | A1 | 1/2016 | Deenoo et al. | |
| 2016/0029282 | A1* | 1/2016 | Lee | H04W 36/14 370/332 |
| 2016/0044639 | A1* | 2/2016 | Yi | H04L 47/624 370/329 |
| 2016/0044690 | A1* | 2/2016 | Li | H04W 52/0209 370/329 |
| 2016/0057585 | A1* | 2/2016 | Horn | H04W 80/02 370/312 |
| 2016/0057658 | A1* | 2/2016 | Horn | H04L 43/16 |
| 2016/0174107 | A1* | 6/2016 | Kanugovi | H04L 12/28 370/236 |
| 2016/0219475 | A1* | 7/2016 | Kim | H04L 5/00 |
| 2016/0277957 | A1* | 9/2016 | Patel | H04W 28/0221 |
| 2016/0278138 | A1* | 9/2016 | Chen | H04W 36/0027 |
| 2016/0285716 | A1* | 9/2016 | Pelletier | H04L 5/0098 |
| 2016/0315868 | A1* | 10/2016 | Zhang | H04L 47/34 |
| 2016/0373964 | A1* | 12/2016 | Nagasaka | H04W 28/08 |
| 2016/0374036 | A1* | 12/2016 | Wang | H04W 76/00 |
| 2017/0070923 | A1* | 3/2017 | Li | H04W 36/0066 |
| 2017/0085492 | A1* | 3/2017 | Xiao | H04L 1/1874 |
| 2017/0181206 | A1* | 6/2017 | Lee | H04W 76/14 |
| 2017/0223578 | A1* | 8/2017 | Hong | H04L 41/0803 |
| 2017/0367007 | A1* | 12/2017 | Sirotkin | H04L 63/0428 |
| 2017/0367141 | A1* | 12/2017 | Nagasaka | H04W 76/16 |
| 2018/0098376 | A1* | 4/2018 | Jang | H04W 28/02 |

OTHER PUBLICATIONS

NVIDIA, "RRC and PDCP/RLC Interactions for Dual Connectivity", R2-145227, 3GPP TSG-RAN WG2 #88, San Francisco, USA, Nov. 17-21, 2014, pp. 1-7.

Nokia Networks et al., "Reconfiguration cases with two Bearers", R2-144870, 3GPP TSG-RAN WG2 Meeting #88, San Francisco, USA, Nov. 17-21, 2014, pp. 1-4.

* cited by examiner

METHOD FOR RECONFIGURING WIRELESS BEARER AND DEVICE THEREOF

CROSS REFERENCE TO RELATED APPLICATIONS

This application is a National Stage Patent Application of PCT International Patent Application No. PCT/KR2016/003203 (filed on Mar. 29, 2016) under 35 U.S.C. § 371, which claims priority to Korean Patent Application Nos. 10-2015-0046974 (filed on Apr. 2, 2015), and 10-2016-0037352 (filed on Mar. 29, 2016), the teachings of which are incorporated herein in their entireties by reference.

TECHNICAL FIELD

The present disclosure relates to technology for enabling a base station to transmit, at a radio access network (RAN) level, user plane data to user equipment establishing a wireless connection by adding a wireless local area network (WLAN) connection. More particularly, the present disclosure relates to a method and device for configuring or reconfiguring a data radio bearer for transmitting user plane data.

BACKGROUND ART

Due to the development of communications systems, various types of user equipments have been introduced to consumers, both organizations and individuals. Current mobile communications systems belonging to the $3^{rd}$ generation partnership project (3GPP) family, such as long-term evolution (LTE) and LTE-Advanced, are high-speed and high-capacity communications systems that transmits various types of data, such as images and wireless data. Such high-speed and high-capacity communications systems require a technology for transmitting a large amount of data at a high speed as fast as that of wired communications networks. For transmitting high-capacity data, a plurality of cells may be used to efficiently transmitting data.

However, there are limitations, in that a base station allows a plurality of user equipments to transmit large-capacity data, using limited frequency resources. That is, it may be relatively expensive for a specific service provider to ensure frequency resources for exclusive use, which is problematic.

In addition, a plurality of providers or communications systems can share unlicensed frequency bands that a specific provider or a specific communications system cannot exclusively use. For example, wireless local area network (WLAN) technology represented by Wi-Fi provides data transmission/reception services using unlicensed frequency resources.

Thus, for mobile communications systems, it is required to develop technology for transmitting and receiving data to and from user equipment using Wi-Fi access points (APs). In particular, when a base station transmits and receives data to and from user equipment using Wireless resources of WLAN and wireless resources of a base station, it is required to develop specific procedures and methods regarding such data transmission and reception.

DISCLOSURE

Technical Problem

The present disclosure, made in consideration of the above-described problems, provides a method and device for adding, modifying, releasing, and changing, by a base station, a radio bearer (or reordering process) using at least one of wireless local area network (WLAN) wireless resources and wireless resources of a base station.

Also provided are a reconfiguring method and device for changing a radio bearer using Wireless resources of WLAN to a radio bearer using wireless resources of a base station. Also provided are a reconfiguring method and device for changing a radio bearer using wireless resources of a base station to a radio bearer using Wireless resources of WLAN.

Technical Solution

According to an aspect of the present disclosure, provided is a method of reconfiguring a radio bearer by user equipment. The method may include: receiving a higher layer signal including information for changing a data radio bearer type of a specific radio bearer configured to receive downlink data from a base station using only wireless local area network (WLAN) wireless resources; performing, by a PDCP entity, a PDCP data recovery procedure based on the information for changing the data radio bearer type of the specific radio bearer; and performing, by the PDCP entity, a reordering procedure for the specific radio bearer.

According to another aspect of the present disclosure, provided is a method of reconfiguring a radio bearer by user equipment. The method may include: receiving a higher layer signal including information for changing a data radio bearer type of a specific radio bearer configured to receive downlink data from a base station using only wireless resources of a base station; and starting, by a PDCP entity, a reordering procedure for the specific radio bearer based on the information for changing the data radio bearer type of the specific radio bearer.

According to another aspect of the present disclosure, provided is a method of reconfiguring a radio bearer of user equipment by a base station. The method may include: transmitting a higher layer signal including information for changing a data radio bearer type of a specific radio bearer configured to receive downlink data using only Wireless resources of WLAN; receiving a PDCP status report from user equipment; and retransmitting, by a PDCP entity, PDCP PDUs or PDCP SDUs, which are not confirmed as successfully delivered, based on the PDCP status report.

According to another aspect of the present disclosure, provided is user equipment reconfiguring a radio bearer. The user equipment may include: a receiver configured to receive a higher layer signal including information for changing a data radio bearer type of a specific radio bearer configured to receive downlink data from a base station using only wireless resources of WLAN; and a controller configured to perform, by a PDCP entity, a PDCP data recovery procedure based on the information for changing the data radio bearer type of the specific radio bearer, and performing, by the PDCP entity, a reordering procedure for the specific radio bearer.

According to another aspect of the present disclosure, provided is user equipment reconfiguring a radio bearer. The user equipment may include: a receiver configured to receive a higher layer signal including information for changing a data radio bearer type of a specific radio bearer configured to receive downlink data from a base station using only wireless resources of a base station; and a controller configured to start, by a PDCP entity, a reordering procedure for the specific radio bearer based on the information for changing the data radio bearer type of the specific radio bearer.

According to another aspect of the present disclosure, provided is a base station reconfiguring a radio bearer of user equipment. The base station may include: a transmitter configured to transmit a higher layer signal including information for changing a data radio bearer type of a specific radio bearer configured to receive downlink data using only Wireless resources of WLAN; a receiver configured to receive a PDCP status report from user equipment; and a controller retransmitting, by a PDCP entity, PDCP PDUs or PDCP SDUs, which are not confirmed as successfully delivered, based on the PDCP status report.

Advantageous Effects

According to embodiments of the present disclosure as set forth above, a base station can transmit and receive data to and from user equipments by dynamically using Wireless resources of WLAN.

In addition, the present disclosure provides a method of reconfiguring, by a base station, a radio bearer together with user equipment by transmitting user plane data using Wireless resources of WLAN in addition to wireless resources of a base station, such that data can be transmitted without loss using the radio bearer mapped to an acknowledged mode radio link control (AM RLC).

MODE FOR INVENTION

Figure 1:
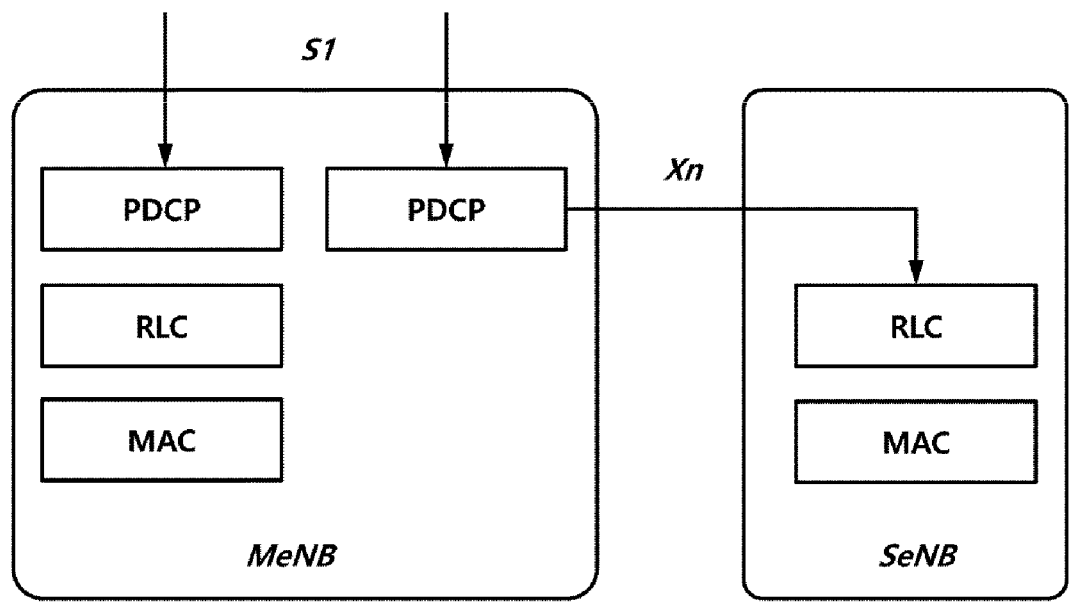
FIG. 1 illustrates a 2C solution structure in a dual connectivity situation.

Hereinafter, embodiments of the present disclosure will be described in detail with reference to illustrative drawings. Throughout this document, reference should be made to the drawings, in which the same reference numerals and symbols will be used to designate the same or like components. In the following description of the present disclosure, detailed descriptions of known functions and components incorporated herein will be omitted in the case that the subject matter of the present disclosure may be rendered unclear thereby.

Herein, a machine type communication (MTC) user equipment (UE) may refer to a user equipment supporting a low-cost strategy (or low complexity) or a user equipment supporting coverage enhancement. In addition, herein, the MTC user equipment may refer to a user equipment supporting both the low-cost strategy (e.g., low complexity) and coverage enhancement. Alternatively, the MTC user equipment used herein may refer to a user equipment defined as a specific category for supporting low cost strategy (e.g., low complexity) and/or coverage enhancement.

In this specification, the MTC user equipment may refer to a newly-defined 3GPP Release 13 low cost (e.g., low complexity) UE category/type user equipment performing MTC-related operations on the basis of long-term evolution (LTE). Alternatively, the MTC user equipment may refer to a UE category/type user equipment defined in the existing 3GPP Release 12 or previous versions that support improved coverage, compared to typical LTE coverage or support low-power consumption or a newly-defined Release 13 low cost (or low complexity) UE category/type user equipment.

Wireless communications systems according to the present disclosure are widely deployed to provide a range of communications services, such as voice and packet data. Wireless communications systems include user equipments (UE) and base stations (BSs) or evolved node Bs (eNBs). As used in the specification, the term "user equipment" should be interpreted as having a comprehensive meaning indicating a wireless communications user equipment, including not only user equipment used in wideband code division multiple access (WCDMA), long-term evolution (LTE), high speed packet access (HSPA), and the like, but also all of a mobile station (MS), a user terminal (UT), a subscriber station (SS), a wireless device, and the like, used in the global system for mobile communications (GSM).

A base station or cell typically refers to a station that communicates with a user equipment. The base station or cell may also be referred to using any other term, such as a node B, an evolved node B (eNB), a sector, a site, a base transceiver system (BTS), an access point (AP), a relay node, a remote ratio head (RRH), a radio unit (RU), a small cell, or the like.

Herein, the base station or cell should be interpreted as being a comprehensive term indicating a partial area or function covered by a base station controller (BSC) in CDMA, a node B in WCDMA, an eNB or a sector (or site) in LTE, or the like. In addition, the base station or cell comprehensively indicates a variety of coverage areas, such as a mega cell, a macro cell, a microcell, a picocell, a femtocell, and communications ranges of a relay node, an RRH, an RU, and a small cell.

A variety of cells as stated above are controlled by base stations, respectively, which may be interpreted in two senses. Each of the base stations i) may be an apparatus itself that provides a mega cell, a macro cell, a microcell, a picocell, a femtocell, or a small cell in relation to a wireless communications area, or ii) may indicate the wireless communications area itself. In i), entire apparatuses providing wireless areas are controlled by the same entity or entire apparatuses interacting with one another to form a wireless area in a coordinated manner may refer to base stations. An eNB, an RRH, an antenna, an RU, a low power node (LPN), a point, a transceiver point, a transmission point, a reception point, and the like form embodiments of the base station, depending on the configuration of the wireless area. In ii), the wireless area itself in which a signal is received or transmitted may refer to a base station, in terms of a user or an adjacent base station.

Thus, the base stations may be referred to as the mega cell, the macro cell, the microcell, the picocell, the femtocell, the small cell, the RRH, the antenna, the RU, the LPN, the point, the eNB, the transceiver point, the transmission point, and the reception point.

Herein, the user equipment and the base station comprehensively refer to two types of transmission/reception entities for realizing technologies or technical concepts described herein and are not limited by terms or words that are explicitly defined. The user equipment and the base station are comprehensively used as two (uplink or downlink) transmission/reception entities for realizing technologies or technical concepts described herein and are not limited by terms or words that are explicitly defined. Here, the term "uplink (UL)" relates to data transmission/reception from the user equipment to the base station, whereas the term "downlink (DL)" relates to data transmission/reception from the base station to the user equipment.

There are no limitations in multiple access technologies applied to the wireless communications system. A variety of multiple access methods, such as code division multiple access (CDMA), time division multiple access (TDMA), frequency division multiple access (FDMA), orthogonal frequency division multiple access (OFDMA), OFDM-FDMA, OFDM-TDMA, and OFDM-CDMA, may be used. An exemplary embodiment of the present disclosure is applicable for the allocation of resources in asynchronous wireless communications evolving into LTE and LTE-Advanced through global systems for mobile communication (GSM), wideband code division multiple access (WCDMA), and high-speed packet access (HSPA) and synchronous wireless communications evolving into CDMA, CDMA-2000, and ultra-mobile broadband (UMB). The present disclosure should not be interpreted as being limited or restricted to a specific field of wireless communications and should be interpreted as covering all technical fields to which the concept of the present disclosure is applicable.

Uplink (UL) transmission and downlink (DL) transmission may employ i) time division duplex (TDD) in which transmission is performed at different fractions of time or ii) frequency division duplex (FDD) in which a transmission is performed at different frequencies.

In addition, a system such as LTE or LTE-Advanced forms standards by forming an uplink and a downlink, based on a single carrier wave or a pair of carrier waves. The uplink and the uplink transmit control information through a control channel, such as a physical downlink control channel (PDCCH), a physical control format indicator channel (PCFICH), a physical hybrid-ARQ indicator channel (PHICH), a physical uplink control channel (PUCCH), and an enhanced physical downlink control channel (EPDCCH). In addition, the uplink and the downlink are constituted of a data channel, such as a physical downlink shared channel (PDSCH) or a physical uplink shared channel (PUSCH), to transmit data.

In addition, control information can be transmitted using an enhanced or extended PDCCH (EPDCCH).

Herein, the cell may refer to coverage of a signal transmitted from a transmission point or a transmission/reception point, a component carrier having the coverage of the signal transmitted from the transmission point or the transmission/reception point, or the transmission point or the transmission/reception point.

The wireless communications system to which embodiments are applied may be i) a coordinated multi-point transmission/reception (CoMP) system including two or more transmission/reception points that transmit a signal in a coordinated manner, ii) a coordinated multi-antenna transmission system, or iii) a coordinated multi-cell communications system. The CoMP system may include at least two multi-transmission/reception points and user terminals.

The multi-transmission/reception points may be a base station or a macro cell (hereinafter referred to as an "eNB") and at least one RRH connected to the eNB via a fiber optic cable or an optical fiber and controlled by wires. The RRH has high transmission power, or has low transmission power within the area of the macro cell.

Hereinafter, the downlink refers to communications from each multi-transmission/reception point to user equipment or a path for such communications. The uplink refers to communications from the user equipment to the multi-transmission/reception point or a path for such communications. In the DL, a transmitter may be a portion of the multi-transmission/reception point, and a receiver may be a portion of the user equipment. In the UL, the transmitter may be a portion of the user equipment, and the receiver may be a portion of the multi-transmission/reception point.

Hereinafter, when a signal is transmitted/received via a channel, such as the PUCCH, PUSCH, PDCCH, EPDCCH, or physical PDSCH, it may be described that "a PUCCH, PUSCH, PDCCH, EPDCCH, or PDSCH is transmitted/received."

In addition, hereinafter, transmitting or receiving a PDCCH or transmitting or receiving a signal on the PDCCH may refer to transmitting or receiving an EPDCCH or transmitting or receiving a signal on the EPDCCH.

That is, the PDCCH described hereinafter indicates the PDCCH or the EPDCCH, or is used in the sense of including both the PDCCH and the EPDCCH.

For the convenience of explanation, the EPDCCH may be applied as an embodiment of the present disclosure to the portion described as the PDCCH, and the PDCCH may be applied, as an embodiment of the present disclosure, to the portion described as the EPDCCH.

In the meantime, higher layer signaling described hereinafter includes radio resource control (RRC) signaling to transmit RRC information including an RRC parameter.

The eNB performs downlink transmission to user equipment. The eNB can transmit a physical downlink shared channel (PDSCH), which is a main channel for unicast transmission, and a physical downlink control channel (PDCCH), on which downlink control information, such as scheduling necessary for the reception of the PDSCH, and scheduling approval information for transmission on an uplink data channel (e.g. a physical uplink shared channel (PUSCH)) are transmitted. Hereinafter, the transmission of a signal on each channel will be described as the transmission of the corresponding channel.

Herein, a wireless local area network (WLAN) carrier refers to a wireless resource of a WLAN. The WLAN carrier may also be referred to using a variety of terms, as required, such as a WLAN wireless link, a WLAN radio, a WLAN wireless resource, and a WLAN wireless network. Hereinafter, for a better understanding, the terms used herein, such as the WLAN wireless link, the WLAN radio, the WLAN carrier, and the WLAN wireless network, will be described as the WLAN wireless resource, and a bearer using the WLAN wireless resource will be described as a WLAN bearer. In addition, herein, a WLAN terminal refers to a logical WLAN network node. For example, the WLAN terminal may be a WLAN AP or a WLAN access controller (AC). The WLAN terminal may be a WLAN network node, such as a typical WLAN AP or a typical WLAN AC, or may be a WLAN network node in which a function enabling WLAN aggregation transmission is added to a typical WLAN AP or a typical WLAN AC. The WLAN terminal may be embodied as an independent entity or as a functional entity included in another entity. Hereinafter, the WLAN network node will be referred to as the WLAN terminal or the WLAN AP as required. In addition, herein, a wireless resource provided by a base station (eNB) will be referred to as a base station wireless resource, a base station carrier, or an evolved-UMTS terrestrial radio access network (E-UTRAN) carrier, and a bearer using the base station wireless resource will be referred to as a base station bearer.

3GPP/WLAN interworking technology provides a radio access network (RAN) assisted WLAN interworking function. E-UTRAN can assist an RRC_IDLE user equipment (UE) and an RRC_CONNECTED user equipment for UE-based bidirectional traffic steering.

E-UTRAN provides assistance parameters through broadcast signaling or dedicated RRC signaling. RAN assistance parameters may include at least one of an E-UTRAN signal strength threshold, a WLAN channel use threshold, a WLAN backhaul data rate threshold, a WLAN signal strength (or WLAN signal strength threshold, for example, a beacon received signal strength indication (RSSI) threshold), and an offload preference indicator. In addition, E-UTRAN can provide a list of WLAN identifiers to a user equipment (UE) through broadcast signaling.

The user equipment can use RAN assistance parameters to evaluate access network selection and traffic steering rules defined in the TS 36.304 document and ANDSF policies defined in the TS 24.312 specification in order to determine the traffic steering between E-UTRAN and WLAN, standardized in 3GPP TS 23.402 the document: "Architecture Enhancements for Non-3GPP Accesses."

When the access network selection and traffic steering rules defined in the TS 36.304 document are fulfilled, the user equipment can indicate the fulfillment to access stratum (AS) higher layers (or upper layers).

When the user equipment applies the access network selection and traffic steering rules, the user equipment performs traffic steering at an access point name (APN) granularity between E-UTRAN and WLAN. As described above, the RAN assisted WLAN interworking function only provides a method in which E-UTRAN and WLAN are stand-alone to work in concert with each other.

Necessity for an LTE WLAN integration function, made in consideration of tighter aggregation than Rel-12 RAN assisted WLAN interworking, has been increased. As described above, in the Rel-12 RAN assisted WLAN interworking, E-UTRAN and WLAN were only able to operate independently at the APN granularity. Thus, in the case in which the user equipment transmits user plane data, in consideration of the wireless state and mobility of the user equipment, E-UTRAN was not able to add a WLAN carrier as a carrier within E-UTRAN at a RAN level to simultaneously use the E-UTRAN carrier and/or the WLAN carrier. In addition, in the case in which the user equipment transmits user plane data belonging to a specific bearer, in consideration of wireless state and mobility of the user equipment with the E-UTRAN carrier being maintained, it was impossible to add a WLAN carrier to the user equipment as a carrier within E-UTRAN in an RAN level to perform transmission through the E-UTRAN carrier and/or the WLAN carrier.

To overcome these problems, a method of separating (or splitting or routing) user plane data on E-UTRAN layer 2 and a method of interworking user plane data can be considered, so that E-UTRAN can transmit user plane data on the E-UTRAN carrier and/or the WLAN by adding the WLAN carrier as a carrier within E-UTRAN in the RAN level. For example, the user plane data separating method and the interworking method can be applied, based on 2C and 3C, among Dual connectivity (DC) solutions. DC solutions 2C and 3C are solutions proposed in a 3GPP DC section and will be described in more detail hereinafter.

FIG. 1 illustrates a 2C solution structure in a dual connectivity (DC) situation.

For an example, similar to a DC 2C solution, in a structure for adding Wireless resources of WLAN to a user equipment, a first packet data convergence protocol (PDCP) entity can transmit data on a WLAN carrier, in concert with a WLAN AP, and a second PDCP entity connected to the first PDCP entity by peering can receive the data. In the 2C solution structure, the PDCP entity of a master eNB (MeNB) is connected to a radio link control (RLC) entity of a secondary eNB (SeNB).

Figure 2:
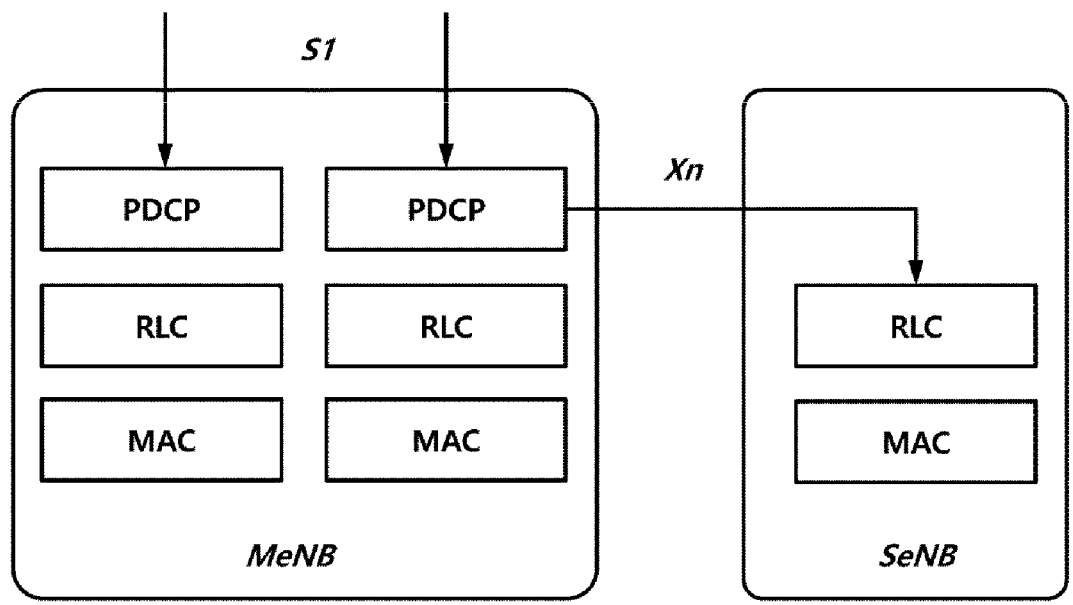
FIG. 2 illustrates a 3C solution structure in a dual connectivity situation.

FIG. 2 illustrates a 3C solution structure in a DC situation.

For another example, in the structure for adding Wireless resources of WLAN to a user equipment, a first PDCP entity can perform data transmission by dividing data into i) data to be transmitted through an E-UTRAN carrier and i) data to be transmitted through a WLAN carrier like a DC 3C solution. Accordingly, a second PDCP entity connected to the first PDCP entity by peering can receive the transmitted data (by aggregation). In a 3C solution structure, a PDCP entity of a master base station (MeNB) is connected to an RLC entity of the master base station and an RLC entity of a secondary base station. The PDCP entity performs a routing function.

Figure 3:
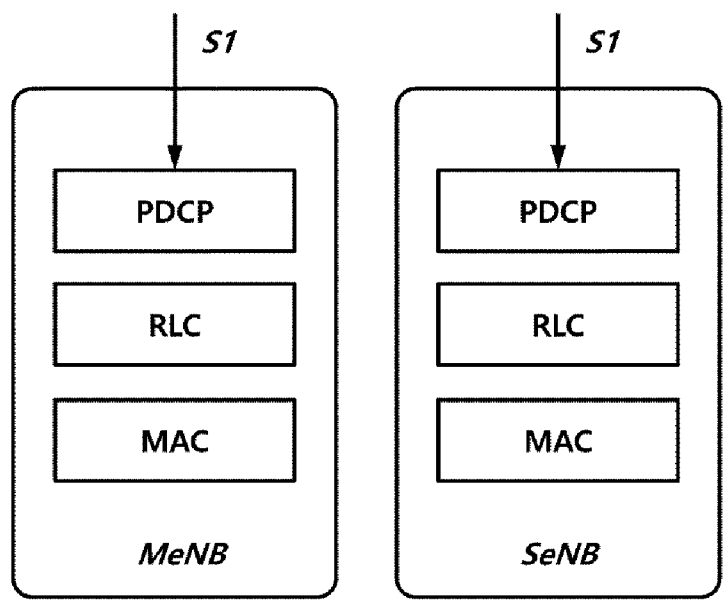
FIG. 3 illustrates a 1A solution structure in a dual connectivity situation.

FIG. 3 illustrates a 1A solution structure in a DC situation.

For still another example, the 1A solution structure in a DC situation may be considered. In the 1A solution structure, a PDCP entity of each base station is connected to an RLC entity in the corresponding base station.

However, it requires to interact with a WLAN AP in order to add a WLAN carrier at a RAN level when a user equipment has a wireless connection with the E-UTRAN carrier (e.g. an RRC connection) established by E-UTRAN. This may significantly differ from a dual connectivity operation with a secondary base station using the same E-UTRAN technology. For example, an RLC function provided by typical DC is not provided to the WLAN carrier. Thus, the base station may need to perform operations for addition, modification, or release to a (data) radio bearer (or a wireless bearer; hereinafter will be referred to as a radio bearer) with the user equipment by adding the WLAN carrier. However, no specific methods have been proposed for such operations. That is, the configuring and/or reconfiguring operations, such as adding, modifying, changing, releasing the radio bearer, are accompanied by specific operations of each of layer 2 entities associated therewith. Thus, it is necessary to define the efficient operation of each of the layer 2 entities in this regard. However, there has been disclosed no specific solution to this manner.

The present disclosure made in consideration of the above-described problem provides a method of configuring and reconfiguring a radio bearer in order to enable a base station to add, modify, release, or change the radio bearer with user equipment by adding a WLAN carrier. It is also intended to provide efficient operations of each of layer 2 entities associated with the operations of adding, modifying, changing, and releasing the radio bearer.

The present disclosure can be provided with a scenario in which the base station and the WLAN AP are non-co-located. In the scenario in which the base station and the WLAN AP are non-co-located, the base station and the WLAN AP can be connected or established based on a non-ideal backhaul, a near-ideal backhaul, or an ideal backhaul. In addition, the present disclosure can be provided with a scenario in which the base station and the WLAN AP are co-located.

For E-UTRAN to add the WLAN carrier as a carrier in the user equipment at the RAN level and to transmit and receive user plane data using the E-UTRAN carrier and the WLAN carrier, it may require a protocol structure and the operation of each specific layer, designed for this purpose.

The addition of Wireless resources of WLAN or a WLAN carrier as a carrier by E-UTRAN means that the user equipment and the base station additionally configure a function and/or an entity for transmitting data on the WLAN carrier, in addition to an existing E-UTRAN cell.

The term "E-UTRAN" is used herein for convenience of explanation and may refer to an LTE/LTE-Advanced or any 3GPP wireless AP or base station.

For E-UTRAN to transmit user plane data at a radio bearer granularity on the E-UTRAN carrier or WLAN carrier by adding Wireless resources of WLAN to the user equipment as a carrier within E-UTRAN in the RAN level, it is possible to separate (or split or route) or interwork user plane data on a sub-layer of E-UTRAN layer 2.

For example, similar to the above-described DC 2C solution, a first PDCP entity can transmit data on a WLAN carrier in concert with a WLAN AP, and a second PDCP entity connected to the first PDCP entity by peering can receive the data. Hereinafter, for convenience of explanation, similar to the DC 2C solution, a bearer allowing a first PDCP entity to transmit data on a WLAN carrier in concert with a WLAN AP, and a second PDCP entity connected to the first PDCP entity by peering to receive the data will be referred to as a WLAN bearer. This term is only used for a better understanding and other terms may be used to indicate the same idea.

The WLAN bearer can be used for uplink data transmissions and downlink data transmissions. Alternatively, the WLAN bearer can be used for downlink data transmissions. In this case, uplink data can be transmitted on the E-UTRAN carrier. Alternatively, the WLAN bearer can be used for uplink data transmissions, while downlink data can be transmitted on the E-UTRAN carrier.

The above-described E-UTRAN carrier may refer to a bearer using only wireless resources of a base station in an LTE-WLAN aggregation situation or may refer to a bearer using only Wireless resources of WLAN in an LTE-WLAN aggregation situation. The WLAN bearer can switch and change wireless resources that are used. Specifically, the switching WLAN bearer can be reconfigured in response to a higher layer message to switch from a state of using only Wireless resources of WLAN to a state of using only wireless resources of a base station or can be reconfigured in response to a higher layer message to switch from a state of using only wireless resources of a base station to a state of using only Wireless resources of WLAN. That is, although the WLAN bearer will be described, hereinafter, as using only Wireless resources of WLAN, the WLAN bearer will be regarded as being a switching bearer that can use only wireless resources of a base station in response to the reconfiguration of the bearer.

In addition, similar to the above-described DC 3D solution, a first PDCP entity can transmit data by separating i) data to be transmitted on an E-UTRAN carrier and/or ii) data to be transmitted on a WLAN carrier, while a second PDCP entity connected to the first PDCP entity by peering is receiving (or receive and aggregate) the data. Hereinafter, for convenience of explanation, similar to the DC 3C solution, a bearer allowing a first PDCP entity to transmit data by separating i) data to be transmitted on an E-UTRAN carrier and/or ii) data to be transmitted on a WLAN carrier and a second PDCP entity connected to the first PDCP entity by peering to receive the data will be referred to as an integration bearer (or an aggregation bearer or a WLAN split bearer). This term is only used for a better understanding and other terms may be used to indicate the same idea.

The integration bearer can be used for uplink data transmissions and downlink data transmissions. For example, the integration bearer may be configured to transmit downlink data on the E-UTRAN carrier and the WLAN carrier. In addition, the integration bearer may be configured to transmit uplink data on the E-UTRAN carrier and the WLAN carrier.

Alternatively, the integration bearer can be used for downlink data transmissions. For example, the integration bearer can allow downlink data to be transmitted on the E-UTRAN carrier and the WLAN carrier. In this case, the integration bearer can allow uplink data to be transmitted on the E-UTRAN carrier. Alternatively, the integration bearer can allow downlink data to be transmitted on the E-UTRAN carrier and the WLAN carrier. In this case, uplink data can be transmitted on the WLAN carrier.

Alternatively, the integration bearer can be used for uplink data transmissions. For example, the integration bearer can allow uplink data to be transmitted on the E-UTRAN carrier and the WLAN carrier. In this case, downlink data can be transmitted on the E-UTRAN carrier. In another example, the integration bearer can allow uplink data to be transmitted on the E-UTRAN carrier and the WLAN carrier. In this case, downlink data can be transmitted on the WLAN carrier.

In addition, when an RRC connection is established between the base station and the user equipment, the base station can perform additional WLAN bearer configuration or WLAN bearer reconfiguration by adding a WLAN carrier.

For an example, the user equipment having the established RRC connection can add a new radio bearer as a WLAN bearer through core network signaling. The user equipment having the established RRC connection can add a new radio bearer as an integration bearer through core network signaling.

For another example, a radio bearer (E-UTRAN bearer), previously configured in the user equipment having the established RRC connection, can be reconfigured, modified, and/or changed to a WLAN bearer.

For still another example, a radio bearer (E-UTRAN bearer), previously configured in the user equipment having the established RRC connection, can be reconfigured, modified, and/or changed to an integration bearer. Hereinafter, for convenience of explanation, a data radio bearer (DRB) configured in user equipment having an RRC connection established with a base station, as described above, or a radio bearer only transmitted through an E-UTRAN carrier will be referred to as an E-UTRAN bearer or a base station bearer. This term is only used for a better understanding and other terms may be used to indicate the same idea.

WLAN Bearer Addition

When a WLAN bearer is added to a user equipment using an RRC connection reconfiguration message, the user equipment can perform the following operations.

The user equipment establishes a PDCP entity. Based on PDCP configuration information (PDCP-Config), the user equipment configures the PDCP entity.

The user equipment establishes an entity for transmitting user plane data on a WLAN carrier. Then, the user equipment configures the established entity based on configuration information regarding the established entity. Hereinafter, for convenience of explanation, the entity for transmitting user plane data on the WLAN carrier from the user equipment will be referred to as the WLAN entity). This term is only used for better understanding, and other terms may be used to indicate the same idea.

Aggregation Bearer Addition

When an integration bearer is added to a user equipment using an RRC connection reconfiguration message, the user equipment can perform the following operations.

The user equipment establishes a PDCP entity, and based on PDCP configuration information (PDCP-Config), the user equipment configures the PDCP entity.

The user equipment establishes an RLC entity, and based on RLC configuration information (RLC-Config), the user equipment configures the RLC entity.

The user equipment establishes a WLAN entity, and based on WLAN entity configuration information, the user equipment configures the WLAN entity.

Hereinafter, operations of a user equipment and a base station according to the present disclosure will be described with reference to the accompanying drawings. In particular, embodiments of a method of changing a specific radio bearer configured in the user equipment and the base statin from an E-UTRAN bearer to a WLAN bearer or from a WLAN bearer to an E-UTRAN bearer will be described.

Figure 4:
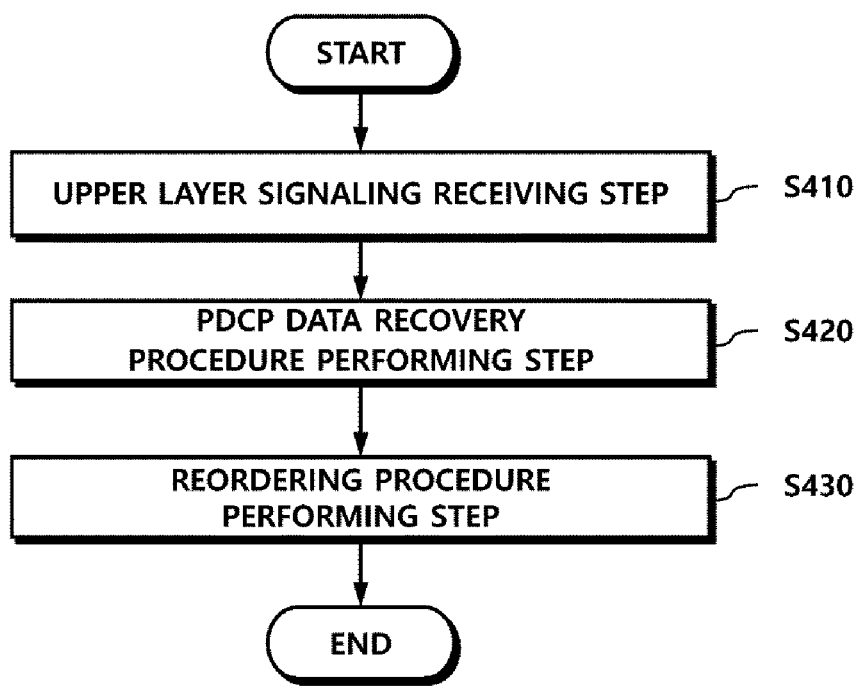
FIG. 4 illustrates operations of a user equipment according to an embodiment of the present disclosure.

FIG. 4 illustrates operations of a user equipment according to an embodiment of the present disclosure.

According to an embodiment of the present disclosure, provided is a method of reconfiguring a radio bearer by user equipment. The method includes the steps of: receiving a higher layer signal (e.g., an upper layer signal) including information for changing the data radio bearer type of a specific radio bearer configured to receive downlink data from a base station using only Wireless resources of WLAN; performing, by a PDCP entity, a PDCP data recovery procedure based on the information for changing the data radio bearer type of the specific radio bearer; and performing, by the PDCP entity, a reordering procedure for the specific radio bearer.

Referring to FIG. 4, in step S410, the user equipment receives a higher layer signal including information for changing the data radio bearer type of a specific radio bearer configured to receive downlink data from a base station using only Wireless resources of WLAN. The user equipment may configure a radio bearer together with a base station or a WLAN AP by adding a WLAN bearer or an integration bearer as described above. In addition, the specific radio bearer additionally configured in the user equipment may be a WLAN bearer using only WLAN radio resources. However, afterwards, the WLAN bearer according to embodiments of the present disclosure may be hanged and reconfigured to an E-UTRAN bearer through higher layer signaling (e.g., upper layer signaling), as described above. In addition, the user equipment can separately configure an E-UTRAN bearer that uses only base station radio resources.

The user equipment can receive data radio bearer type information regarding the specific radio bearer (e.g. the WLAN bearer) configured to receive downlink data from the base station through higher layer signaling, using only Wireless resources of WLAN. For example, the radio bearer type information regarding the radio bearer may be included in an information element of an RCC connection reconfiguration message. That is, when the WLAN bearer is configured in the user equipment, the radio bearer type information may include information indicating that the corresponding WLAN bearer is a bearer that uses only Wireless resources of WLAN. Alternatively, as in embodiments of the present disclosure, the user equipment can receive information for changing the radio bearer type of the corresponding specific radio bearer from the base station in order to change and reconfigure the WLAN bearer to the E-UTRAN bearer.

For example, the user equipment may receive information for changing information regarding the radio bearer of the existing WLAN bearer to information regarding the radio bearer type indicating the E-UTRAN bearer, from the base station. That is, when the radio bearer type information regarding the specific radio bearer is changed from the existing radio bearer type information, the user equipment may recognize a change in the type of the corresponding specific radio bearer.

In step S420, the user equipment performs a PDCP data recovery procedure by the PDCP entity based on the information for changing the data radio bearer type of the specific radio bearer. When the radio bearer type information regarding the specific radio bearer configured to receive downlink data using only Wireless resources of WLAN is changed, the user equipment can perform the PDCP data recovery procedure by the PDCP entity. For example, the user equipment must reconfigure the specific radio bearer to change the radio bearer type of the specific radio bearer from the WLAN bearer to the E-UTRAN bearer. Here, the PDCP entity must perform the PDCP data recovery procedure to prevent data from being lost or missing in downlink data that has typically been received using only Wireless resources of WLAN.

For example, the PDCP entity may compile a PDCP status report and deliver the PDCP status report on PDCP protocol data units (PDCP PDUs) to lower layers. Specifically, the PDCP entity may compile the PDCP status report in PDCP layers and then deliver the PDCP status report to lower layers (e.g. RLC layers or medium access control (MAC) layers) to transmit the PDCP status report to the base station. Accordingly, when a PDCP data recovery procedure is started, the user equipment transmits the PDCP status report to the base station to assist the base station to perform PDCP data retransmission when the specific radio bearer is reconfigured. A specific PDCP data recovery procedure will be described in more detail according to the following embodiments.

In addition, in step S430, the user equipment performs, by the PDCP entity, a reordering procedure for the specific radio bearer. When the type of the specific radio bearer receiving downlink data is changed from the WLAN bearer to the E-UTRAN bearer, the user equipment performs, by the PDCP entity, the reordering procedure for the corresponding specific radio bearer. Specifically, when the base station transmits downlink data, which has been transmitted to the user equipment using Wireless resources of WLAN, to the user equipment using wireless resources of a base station, the user equipment performs the reordering procedure for the received downlink data to prevent data from being lost or missing in order to sequentially transmitting the data (in-sequence transmission).

In this regard, the user equipment may additionally receive information for configuring a reordering timer from the base station. The information for configuring a reordering timer may be received through higher layer signaling.

In addition, in performance of the reordering procedure, when the reordering timer expires, the user equipment delivers all PDCP service data units (PDCP SDUs), stored for reordering, to higher layers in the ascending order of associated count values. That is, similar to an RLC unacknowledged mode (UM), when the reordering timer expires periodically, the user equipment delivers all PDCP SDUs, received and stored out of order, to higher layers, so that downlink data are sequentially delivered to the higher layers. In addition, the user equipment may additionally perform the reordering procedure for the 3GPP TS 36.323 document.

As described above, the user equipment may reconfigure a radio bearer, configured to receive downlink data using only Wireless resources of WLAN, to a radio bearer, configured to receive downlink data using only wireless resources of a base station. In addition, the PDCP entity may reorder downlink data about the specific radio bearer to prevent downlink data from missing or being lost, so that data is sequentially transmitted in this process. The PDCP entity may also compile a PDCP status report and transmit the PDCP status report to the base station to assist the base station in retransmitting PDCP data.

Figure 5:
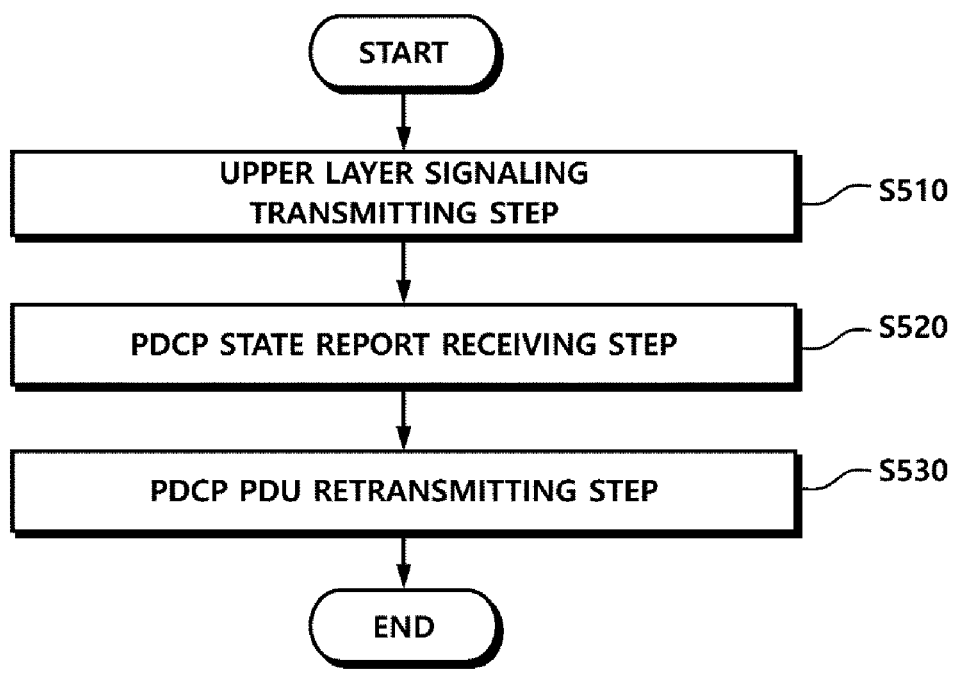
FIG. 5 illustrates operations of a base station according to an embodiment of the present disclosure.

With reference to FIG. 5, a method of reconfiguring a specific radio bearer, which delivers downlink data, to a base station will be described from the viewpoint of the base station.

FIG. 5 illustrates operations of a base station according to an embodiment of the present disclosure.

According to an embodiment of the present disclosure, provided is a method of reconfiguring a radio bearer of user equipment by a base station. The method includes the steps of: transmitting a higher layer signal including information for changing the data radio bearer type of a specific radio bearer configured to receive downlink data using only Wireless resources of WLAN; receiving a PDCP status report from a user equipment; and retransmitting, by the PDCP entity, a PDCP SDU or a PDCP PDU, successful delivery of which has not been confirmed, based on the PDCP status report.

Referring to FIG. 5, in step S610, the base station according to embodiments of the present disclosure transmits a higher layer signal including information for changing the data radio bearer type of a specific radio bearer configured to receive downlink data using only Wireless resources of WLAN. As described above, the base station may generate the information for changing the data radio bearer type of the specific radio bearer (e.g. a WLAN bearer), and transmit the information to the user equipment in order to change the WLAN bearer to the E-UTRAN bearer. For example, the base station may transmit the information for changing the data radio bearer type, through higher layer signaling. The higher layer signal may be an RCC connection reconfiguration message.

In addition, the information for changing the data radio bearer type of the specific radio bearer may further include information for configuring a reordering timer used in the reordering procedure of the user equipment. The user equipment configures the reordering timer by receiving the information for configuring the reordering timer. When the specific radio bearer is reconfigured, the user equipment performs the reordering procedure using the reordering timer.

In addition, in step S520, the base station receives a PDCP status report from the user equipment. When the data radio bearer type of the specific radio bearer is changed, the base station receives the PDCP status report of the corresponding specific radio bearer from the user equipment. When the user equipment receives the information for changing the data radio bearer type of the specific radio bearer, the user equipment compiles a PDCP status report as a first PDCP PDU to be transmitted to lower layers. Then, the user equipment transmits the PDCP status report to the base station.

In addition, in step S530, the base station retransmits a PDCP SDU or a PDCP PDU which are not confirmed as successfully delivered by a PDCP entity, based on the PDCP status report. The base station performs PDCP data recovery using the PDCP status report and then retransmits downlink data to the user equipment using only wireless resources of a base station. For example, the base station retransmits the PDCP PDU, which has been delivered using Wireless resources of WLAN, to the user equipment using wireless resources of a base station. That is, as the specific radio bearer is reconfigured, the PDCP PDU, unconfirmed as successful delivered to an acknowledged mode (AM) RLC entity, is retransmitted to the user equipment in response to the PDCP data recovery procedure.

Hereinafter, the method of reconfiguring a specific radio bearer (a WLAN bearer) using only Wireless resources of WLAN to a specific radio bearer (an E-UTRAN bearer) using only wireless resources of a base station will be described again in detail.

Reconfiguration, Modification, and Change of WLAN Bearer to E-UTRAN Bearer

1) PDCP Reestablishment

When the WLAN bearer configured in the user equipment is reconfigured, modified, or changed to the E-UTRAN bearer using the RCC connection reconfiguration message, the user equipment can perform the following operations.

The user equipment reestablished the PDCP entity.

The WLAN entity can perform one or more operations among the following operations of:

Delivering, by a receiving side, PDCP PDUs, which can be delivered to the PDCP entity, to higher layers, when possible;

Discarding, by the receiving side, remaining data;

Discarding, by a transmitting side, data; and

Discarding control data.

When the PDCP reestablishment is performed as described above, for data lost during the process of changing the radio bearer, the user equipment transmits or retransmits PDCP SDUs, successful delivery of which has not been confirmed, due to PDCP reestablishment. Thus, lossless transmission can be performed. However, according to this method, even in the case of a bearer change without a change in the PDCP entity, complicated specific operations, such as resetting a header compression protocol, changing a security key, transmitting or retransmitting PDCP SDUs, and the like, must be performed, thereby increasing complexity and leading to delays. Thus, as described above, the present disclosure has provided the method of reconfiguring a specific radio bearer without reestablishing a PDCP entity.

2) PDCP Data Recovery

When the PDCP entity is reestablished similar in the foregoing embodiment 1), unnecessary operations may be performed, thereby increasing complexity and leading to delays. Thus, the present disclosure provides a method of performing the PDCP data recovery procedure without reestablishing the PDCP entity. In this case, the PDCP entity may be reconfigured or maintained.

When reconfiguring, modifying, or changing the WLAN bearer configured in the user equipment to the E-UTRAN bearer using to the RCC connection reconfiguration message, the user equipment may perform the following operations. The RCC connection reconfiguration message for reconfiguring, modifying, or changing the WLAN bearer to the E-UTRAN bearer includes information for changing the data radio bearer type. For example, the RCC connection reconfiguration message may include a DRB type in "drb-ToAddModList." When the DRB type of the corresponding specific radio bearer is received after being changed from the present type, the user equipment may reconfigure the corresponding specific radio bearer.

The user equipment recovers data previously submitted to the WLAN entity PDCP.

The WLAN entity can perform one or more operations among the following operations of:

Delivering, by a receiving side, PDCP PDUs, which can be delivered to the PDCP entity, to higher layers, when possible;

Discarding, by the receiving side, remaining data;

Discarding, by a transmitting side, data; and

Discarding control data.

In the related art, the PDCP data recovery involves retransmitting all PDCP PDUs previously submitted to the reestablished AM RLC entity. Thus, when the WLAN bearer is changed to another WLAN bearer, the PDCP PDUs submitted to the WLAN entity must be retransmitted before a bearer change message is received (or the PDCP data recovery is performed).

When the radio bearer is configured to send a PDCP status report on an uplink by higher layers according to the PDCP data recovery procedure, the PDCP status report is compiled and then is submitted to the first PDCP PDU to be transmitted to lower layers.

When the PDCP data recovery for the uplink is performed in the user equipment, the base station must perform a reordering function for corresponding PDCP data. Alternatively, when the PDCP data recovery for a downlink is performed in the base station, the user equipment must perform a reordering function for corresponding PDCP data.

In the related art, the PDCP data recovery is only performed when a split bearer standardized in Rel-12 DC is changed (e.g. when the split bearer is changed to another split bearer without PDCP reestablishment or when the split bearer is changed to an MCG bearer without PDCP reestablishment).

In addition, in the related art, when the split bearer is configured in the user equipment, the reordering function was performed. In an example, when the PDCP entity is associated with two AM RLC entities in a DC situation, the reordering function is performed in the user equipment. In another example, when the split bearer is changed to another split bearer without PDCP reestablishment, the reordering function is performed. In addition, in the related art, the reordering function is used when the split bearer is changed to an MCG bearer without PDCP reestablishment in the user equipment (the PDCP entity is associated with one AM RLC entity after it was, according to the most recent reconfiguration, associated with two AM RLC entities without performing PDCP re-establishment).

Thus, the PDCP starts the reordering function directly after receiving a DC split bearer configuration message and applies a reordering method, such as an RLC UM, using the established reordering timer (t-Reordering-r12). That is, all stored PDCP SDU(s) are delivered to higher layers for the reordering. Specific procedures standardized in TS 36.323 are as follows.

When the reordering is triggered since PDCU data is not sequentially received, and when the reordering timer expires, all PDCP SDUs stored for the reordering are delivered to higher layers in the ascending order of associated count values. (When t-Reordering expires, the UE shall:

deliver to upper layers in ascending order of the associated COUNT value:

all stored PDCP SDU(s) with associated COUNT value(s) less than Reordering_PDCP_RX_COUNT;

all stored PDCP SDU(s) with consecutively associated COUNT value(s) starting from Reordering_PDCP_RX_COUNT;)

Unlikely, in accordance with embodiments of the present disclosure, the reordering procedure is performed when the PDCP data recovery is used in the case of configuring, modifying, and/or changing the WLAN bearer to the E-UTRAN bearer. When the specific radio bearer is a downlink, the base station may add information for configuring a reordering timer for the downlink (or based on which the reordering timer is indicated) to an RRC message and then deliver the RRC message to the user equipment. When the specific radio bearer is an uplink, the base station may perform a reordering function for the uplink.

Alternatively, when the above-described reordering function is not used, a downlink data receiving procedure provided by the PDCP may be used. When the above-described reordering function is not used, for the radio bearer mapped to the AM RLC, PDCP SDUs or PDUs received by the PDCP are directly delivered to higher layers, unless lower layer reestablishment is applied. That is, when the above-described reordering function is not used, PDCP data units may be directly delivered to the higher layers without being reordered, since the RLC ensures in-sequence delivery for data delivered through a single radio link. However, when the above-described reordering function is not used, for the radio bearer mapped to the AM RLC, when lower layer reestablishment occurs, PDCP reordering can be performed before delivery to the higher layers, since the lower layer reestablishment is associated with PDCP reestablishment, such as handover.

Thus, when PDCP data recovery is used in the case of reconfiguring, modifying, and/or changing the above-described WLAN bearer to the E-UTRAN bearer, the user equipment may perform the reordering by improving the downlink data receiving procedure that the typical PDCP provides when the typical reordering function is not used. For example, when the PDCP PDU received by the PDCP entity is caused by a change from the WLAN bearer to the E-UTRAN bearer (or the release of the WLAN entity, or a specific operation of the WLAN entity), the reordering can be performed as follows:

elseif received PDCP SN=Last_Submitted_PDCP_RX_SN+1 or received PDCP SN=Last_Submitted_PDCP_RX_SN−Maximum_PDCP_SN:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

In another example, when the PDCP PDU received by the PDCP is caused by a change from the WLAN bearer to the E-UTRAN bearer (or the release of the WLAN entity, or a specific operation of the WLAN entity), the reordering can be performed as follows:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

As described above, when the bearer type of the specific radio bearer is changed from the WLAN bearer to the E-UTRAN bearer, the receiving side (e.g. a user equipment on a downlink) may perform the PDCP data recovery procedure without PDCP reestablishment, and the PDCP entity may perform the reordering procedure using the reordering timer.

The reconfiguration of the WLAN bearer to the E-UTRAN bearer has been described hereinabove. However, the above-described specific radio bearer includes a switching function allowing the E-UTRAN bearer to be reconfigured to the WLAN bearer. Thus, a method for reconfiguring a specific wireless bearer only using wireless resources of WLAN when wireless resources of a base station, the specific radio bearer is configured to use only Wireless resources of WLAN of a base station will be described hereinafter.

Figure 6:
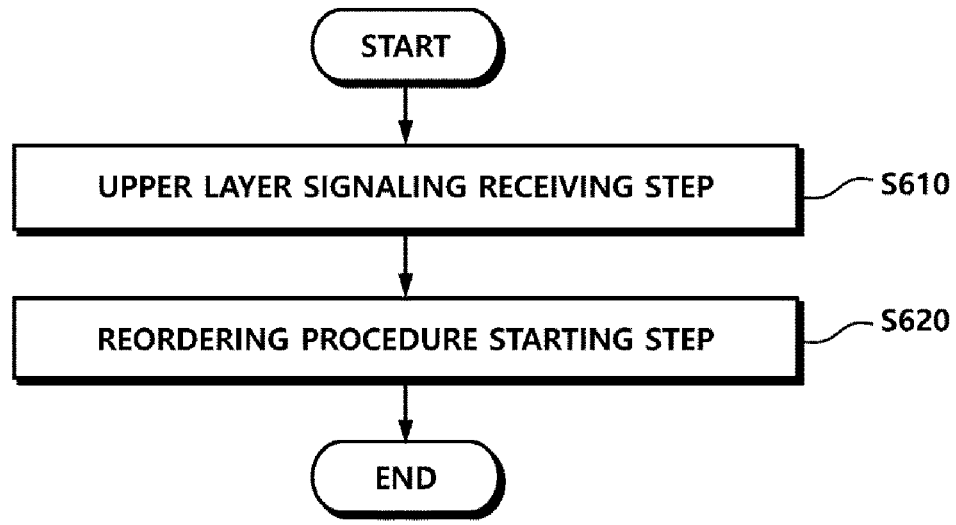
FIG. 6 illustrates operations of a base station according to another embodiment of the present disclosure.

FIG. 6 illustrates operations of a base station according to another embodiment of the present disclosure.

According to the present disclosure, provided is a method of reconfiguring a radio bearer by a user equipment. The method includes the steps of: receiving a higher layer signal including information for changing the data radio bearer type of a specific radio bearer configured to receive downlink data from a base station using only wireless resources of a base station of the base station; and initiating, by a PDCP entity, a reordering procedure for the specific radio bearer based on the information for changing the data radio bearer type of the specific radio bearer.

Referring to FIG. 6, in step S610, the user equipment receives a higher layer signal including information for changing the data radio bearer type of a specific radio bearer configured to receive downlink data from a base station using only wireless resources of the base station. As described with reference to FIG. 4 and FIG. 5, the user equipment may receive the information for changing the data radio bearer type of the specific radio bearer. In this case, in order to reconfigure an E-UTRAN bearer to a WLAN bearer, the information for changing the data radio bearer type includes information for changing the radio bearer from a radio bearer type receiving downlink data using only wireless resources of a base station to a radio bearer type receiving downlink data using only Wireless resources of WLAN. In addition, the information for changing the data radio bearer type may be included in an RCC connection reconfiguration message.

The user equipment examines the information for changing the data radio bearer type, included in the higher layer signal. When the type information of the corresponding specific radio bearer is changed, the user equipment performs a procedure of reconfiguring the specific radio bearer.

In addition, in step S620, the user equipment initiates, by a PDCP entity, a reordering procedure for the specific radio bearer based on the information for changing the data radio bearer type of the specific radio bearer. To reconfigure the specific radio bearer from an E-UTRAN bearer to a WLAN bearer, the user equipment initiates, by the PDCP entity, the reordering procedure for the specific radio bearer. For example, in the user equipment, the PDCP entity counts PDCP SDUs using a reordering timer. When the reordering timer expires, the user equipment delivers the PDCP SDUs to higher layers.

Here, when the E-UTRAN bearer is reconfigured to the WLAN bearer, the PDCP entity of the user equipment may initiate the reordering procedure without performing a PDCP data recovery procedure, unlike from FIG. 4.

Accordingly, the user equipment may reconfigure the E-UTRAN bearer, configured to receive downlink data, to the WLAN bearer without unnecessary delays or losses to data.

Hereinafter, a method of reconfiguring the E-UTRAN bearer to the WLAN bearer according to another embodiment will be described.

Reconfiguration, Modification, or Change of E-UTRAN Bearer to WLAN Bearer

The E-UTRAN bearer configured in the user equipment may be reconfigured, modified, and/or changed to the WLAN bearer using an RCC connection reconfiguration message. In this regard, the base station may transmit information for changing the data radio bearer type of the E-UTRAN bearer on the RCC connection reconfiguration message to the user equipment.

As described above, typical WLAN did not provide the same function as the RLC entity of E-UTRAN. Thus, when the E-UTRAN bearer is reconfigured, modified, and/or changed to the WLAN bearer, corresponding user plane data may be lost in the process of switching from transmission on the E-UTRAN carrier to transmission on the WLAN carrier.

Radio bearers mapped to the AM RLC must be able to ensure lossless data transmission when reconfiguring, modifying, and/or changing the E-UTRAN bearer, configured in the user equipment, to the WLAN bearer, using the RCC connection reconfiguration message. In this regard, the following embodiments may be used.

1) PDCP Reestablishment

When the E-UTRAN bearer, configured in the user equipment, is reconfigured, modified, and/or changed to the WLAN bearer using the RCC connection reconfiguration message, the user equipment may perform the following operations.

The user equipment reestablishes the PDCP entity.

The user equipment reestablishes the RLC entity.

The user equipment establishes the WLAN entity. In addition, the user equipment configures or reconfigures the WLAN entity according to WLAN entity configuration information.

When PDCP reestablishment is requested by higher layers (e.g. an RRC), for a radio bearer mapped to the AM RLC, the user equipment may perform one or more operations among the following operations of:

Resetting a header compression protocol for an uplink (reset the header compression protocol for uplink and start with an IR state in U-mode (if configured);

Resetting a header compression protocol for a downlink (reset the header compression protocol for downlink and start with NC state in U-mode (if configured));

Applying ciphering algorithms and keys provided by higher layers (apply the ciphering algorithm and key provided by higher layers during the re-establishment procedure)'

For a downlink, processing PDCP data received from lower layers due to the reestablishment of the lower layer (RLC) (process the PDCP Data PDUs that are received from lower layers due to the re-establishment of the lower layers);

For an uplink, transmitting or retransmitting all PDCP SDUs, already associated with PDCP sequence numbers (SNs), in the ascending order of count values associated with the PDCP SDUs before PDCP reestablishment, from the first PDCP SDU, successful delivery of the corresponding PDCP PDU of which has not been confirmed by lower layers (e.g. an RLC), as follows (From the first PDCP SDU for which the successful delivery of the corresponding PDCP PDU has not been confirmed by lower layers, perform the retransmission or transmission of all the PDCP SDUs already associated with PDCP SNs in ascending order of the COUNT values associated to the PDCP SDU prior to the PDCP re-establishment as specified below);

Compressing the headers of the PDCP SDUs;

Enciphering the PDCP SDUs using count values associated with the PDCP SDUs; and

Submitting PDCP data PDUs to lower layers.

When RLC reestablishment is requested by higher layers, the AM RLC entity (or the user equipment or the AM RLC entity of the user equipment) performs one or more operations among the following operations of:

When possible, reassembling RLC SDUs, removing RLC headers, and delivering all reassembled RLC SDUs to higher layers in the ascending order of RLC SNs, from any byte segments of AMD PDUs having SNs smaller than a maximum acceptable receive state variable (VR (MR)) (when possible, reassemble RLC SDUs from any byte segments of AMD PDUs with SN<VR (MR) in the receiving side, remove RLC headers when doing so and deliver all reassembled RLC SDUs to upper layer in ascending order of the RLC SN, if not delivered before).

Discarding, by the receiving side, remaining byte segments of AMD PDUs and AMD PDUs (discard the remaining AMD PDUs and byte segments of AMD PDUs in the receiving side).

Discarding, by the transmitting side, all RLC SDUs and AMD PDUs (discard all RLC SDUs and AMD PDUs in the transmitting side).

Discarding all RLC control PDUs (discard all RLC control PDUs).

When the PDCP reestablishment and the RLC reestablishment are performed as described above, lossless transmission may be performed, since the PDCP SDUs not confirmed as successful delivered are transmitted or retransmitted due to the PDCP reestablishment, even when the user equipment discards all RLC SDUs and AMD PDUs, which are not transmitted by the transmitting side, due to the RLC reestablishment. However, according to this method, even in the case of a bearer change without a change in the PDCP entity, complicated specific operations, such as resetting a header compression protocol, changing a security key, transmitting or retransmitting PDCP SDUs, and the like, must be performed, thereby increasing complexity and leading to delays.

Therefore, according to embodiments of the present disclosure, a specific radio bearer may be reconfigured without PDCP reestablishment as follows:

2) PDCP Data Recovery

For an example, when the E-UTRAN bearer, configured in the user equipment, is reconfigured, modified, and/or changed to the WLAN bearer using the RCC connection reconfiguration message, the user equipment may perform the following operations. In this case, the PDCP entity can be reconfigured or maintained.

The user equipment performs PDCP data recovery.

The user equipment reestablishes the RLC entity. Alternatively, the user equipment reconfigures the RLC entity.

The user equipment establishes the WLAN entity. The WLAN entity is configured or reconfigured according to WLAN entity configuration information.

For another example, when the E-UTRAN bearer, configured in the user equipment, is reconfigured, modified, and/or changed to the WLAN bearer using the RCC connection reconfiguration message, the user equipment may perform the following operations.

When PDCP configuration information is included in DRB adding/modifying configuration information, the PDCP entity is reconfigured according to the PDCP configuration information.

The user equipment reestablishes the RLC entity. Alternatively, the user equipment reconfigures the RLC entity.

The user equipment establishes the WLAN entity. The WLAN entity is configured or reconfigured according to the WLAN entity configuration information.

In response to a reestablishment request from a higher layer, the AM RLC entity (or the user equipment or the AM RLC entity of the user equipment) performs the above-described operations. Thus, loss may occur according to data (SDUs or PDUs) discarded due to the RLC reestablishment.

To provide lossless transmission, the user equipment can perform PDCP data recovery. For a radio bearer mapped to the AM RLC for the PDCP data recovery, the user equipment (or the PDCP entity of the user equipment or the PDCP entity) may perform one or more operations among the following operations of:

Retransmitting all previously-submitted PDCP PDUs to the reestablished AM RLC entity in the ascending order of associated count values, from the first PDCP PDU, not confirmed as successfully delivered by lower layers (e.g. RLC layers) (perform retransmission of all the PDCP PDUs previously submitted to re-established AM RLC entity in ascending order of the associated COUNT values from the first PDCP PDU for which the successful delivery has not been confirmed by lower layers); and When the radio bearer is configured to send a PDCP status report on the uplink by higher layers, compiling a status report and submitting the status report to the first PDCP PDU for transmission to lower layers (if the radio bearer is configured by upper layers to send a PDCP status report in the uplink (statusReportRequired), compile a status report, and submit it to lower layers as the first PDCP PDU for the transmission).

When the user equipment performs uplink PDCP data recovery, the base station must perform a reordering function for corresponding PDCP data. When the base station performs downlink PDCP data recovery, the user equipment must perform the reordering function for corresponding PDCP data.

In the related art, the PDCP data recovery is only performed when a split bearer standardized in Rel-12 DC is changed (e.g. when the split bearer is changed to another split bearer without PDCP reestablishment or when the split bearer is changed to an MCG bearer without PDCP reestablishment).

In addition, in the related art, when the split bearer is configured in the user equipment, the reordering function is performed. For an example, the user equipment performs the reordering function when the PDCP entity is associated with two AM RLC entities in a DC situation. For another example, when the split bearer is changed to another split bearer without PDCP reestablishment, the reordering function is performed. In addition, in the related art, the reordering function is used in the user equipment when the split bearer is changed to an MCG bearer without PDCP reestablishment (the PDCP entity is associated with one AM RLC entity after it was, according to the most recent reconfiguration, associated with two AM RLC entities without performing PDCP re-establishment).

Thus, the PDCP starts (e.g., initiates) the reordering function directly after receiving a DC split bearer configuration message. A reordering method, such as an RLC UM, is applied using an established reordering timer (t-Reordering-r12). That is, all PDCP SDUs, stored for reordering, are delivered to higher layers. Specific procedures standardized in TS 36.323 are as follows:

When PDCU data is not sequentially received and the reordering timer expires when reordering is triggered, all PDCP SDUs stored for reordering are delivered to the higher layers in the ascending order of associated count values. (When t-Reordering expires, the UE shall:

deliver to upper layers in ascending order of the associated COUNT value:

all stored PDCP SDU(s) with associated COUNT value(s) less than Reordering_PDCP_RX_COUNT;

all stored PDCP SDU(s) with consecutively associated COUNT value(s) starting from Reordering_PDCP_RX_COUNT;)

Unlikely, in accordance with embodiments of the present disclosure, the reordering procedure is performed when the PDCP data recovery is used in reconfiguring, modifying, and/or changing the WLAN bearer to the E-UTRAN bearer. When the specific radio bearer is a downlink, the base station may add information for changing the reordering timer for the specific radio bearer (or information indicating the specific radio bearer) to an RRC message before delivering the RRC message to the user equipment. When the specific radio bearer is an uplink, the base station may perform the reordering function for the specific radio bearer.

Alternatively, when the above-described reordering function is not used, a downlink data receiving procedure provided by the PDCP may be used. When the above-described reordering function is not used, for the radio bearer mapped to the AM RLC, PDCP PDUs received by the PDCP are directly delivered to higher layers, unless lower layer reestablishment is applied. That is, when the above-described reordering function is not used, PDCP data units may be directly delivered to the higher layers without being reordered, since the RLC ensures in-sequence delivery for data delivered through a single radio link. However, when the above-described reordering function is not used, for the radio bearer mapped to the AM RLC, when lower layer reestablishment occurs, PDCP reordering may be performed before delivery to the higher layers, since the lower layer reestablishment is associated with PDCP reestablishment, such as handover.

Thus, when PDCP data recovery is used in the case of reconfiguring, modifying, and/or changing the above-described WLAN bearer to the E-UTRAN bearer, the user equipment may perform the reordering by improving the downlink data receiving procedure that the PDCP provides when the above-described typical reordering function is not used.

For example, when the PDCP PDU or the PDCP PDU received by the PDCP entity is caused by the reestablishment of lower layers (or a change from the E-UTRAN bearer to the WLAN bearer), the reordering may be performed as follows:

elseif received PDCP SN=Last_Submitted_PDCP_RX_SN+1 or received PDCP SN=Last_Submitted_PDCP_RX_SN−Maximum_PDCP_SN:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

In another example, when the PDCP PDU or the PDCP PDU received by the PDCP is caused by the reestablishment of lower layers (or a change from the E-UTRAN bearer to the WLAN bearer), the reordering may be performed as follows:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

3) Transmission or Retransmission by RLC Entity

In an example, when the E-UTRAN bearer configured in the user equipment is reconfigured, modified, and/or changed to the WLAN bearer using the RCC connection reconfiguration message, the user equipment may perform the following operations:

When the PDCP configuration information is included in the DRB adding/modifying configuration information, the PDCP entity is reconfigured according to the PDCP configuration information.

When the RLC configuration information is included in the DRB adding/modifying configuration information, the RLC entity is reconfigured according to the RLC configuration information.

The user equipment reestablishes the WLAN entity. The WLAN entity is configured or reconfigured according to the WLAN entity configuration information.

For another example, when the E-UTRAN bearer configured in the user equipment is reconfigured, modified, and/or changed to the WLAN using the RCC connection reconfiguration message, the user equipment may perform the following operations:

The PDCP does not trigger the retransmission of the PDCP data (e.g. PDUs or SDUs) transmitted on an uplink. Alternatively, the PDCP does not trigger the retransmission of PDCU PDUs submitted to the RLC entity by the PDCP.

The RLC entity completes the transmission or retransmission of all pending data units, such as RLC SDUs or RLC PDUs.

The user equipment establishes the WLAN entity. The WLAN entity is configured or reconfigured according to the WLAN entity configuration information.

That is, when the E-UTRAN bearer is reconfigured to the WLAN bearer, the RLC entity can be allowed to complete transmission or retransmission without being released.

For the user equipment that has established an RRC connection with the base station, the operation of configuring and/or reconfiguring, by the base station, the WLAN bearer by adding a WLAN carrier is taken as being within the coverage of E-UTRAN. Thus, even when the E-UTRAN bearer configured in the user equipment is reconfigured, modified, and/or changed to the WLAN bearer using the RCC connection reconfiguration message, the user equipment may transmit and receive data to and from the base station through the E-UTRAN carrier and/or the cell.

Thus, the user equipment may transmit or retransmit the radio bearer mapped to the AM RLC, provided for lossless transmission, through the RLC entity, when switching the E-UTRAN bearer to the WLAN bearer.

For example, when the E-UTRAN bearer is reconfigured, modified, and/or changed to the WLAN bearer, the user equipment may perform one or more operations among the following operations:

For the uplink, the RLC entity transmits or retransmits PDCP SDUs and/or PDUs received from the PDCP entity before the reconfiguration, modification, and/or change of the bearer, transmits or retransmits RLC SDUs and/or RLC PDUs received from the PDCP entity before the reconfiguration, modification, and/or change of the bearer, or transmits or retransmits PDCP PDUs submitted by the PDCP entity before the reconfiguration, modification, and/or change of the bearer.

For the uplink, the PDCP entity transmits PDCP PDUs through the WLAN entity, from the PDCP PDU subsequent to PDCP PDUs that the PDCP entity submitted before the reconfiguration, modification, and/or change of the bearer, when the bearer is reconfigured, modified, and/or changed, submits PDCP PDUs to the WLAN entity, or delivers PDCP PDUs through the WLAN entity.

For the downlink, the RLC entity processes RLC data received from lower layers.

For the downlink, the PDCP entity processes PDCP data received from lower layers.

Here, the RLC entity may be maintained until the WLAN bearer is reconfigured, modified, changed, or released. Alternatively, the RLC entity may be maintained until the transmission or retransmission of all PDCP PDUs (or RLC SDUs or RLC PDUs) received from the PDCP entity before the reconfiguration, modification, and/or change of the bearer is successfully completed. Alternatively, the RLC entity may be maintained for a predetermined period of time (timer), so that the transmission or retransmission of all PDCP PDUs, received from the PDCP entity before the reconfiguration, modification, and/or change of the bearer, may be successfully completed. Alternatively, for faster switching from the WLAN bearer to the E-UTRAN bearer, uplink data transmission of the WLAN bearer, or temporary uplink data transmission, the RLC entity may be reconfigured or maintained.

The RRC message may include information instructing the performance of the above-described operations when the E-UTRAN bearer is reconfigured, modified, and/or changed to the WLAN bearer and/or information related to the performance of the above-described operations (e.g. reordering timer configuration information). In addition, a configuration allowing the above-described operations to be performed when the E-UTRAN bearer is reconfigured, modified, and/or changed to the WLAN bearer may be provided previously.

4) Transmission or Retransmission by RLC Entity through WLAN Entity

In an example, when the E-UTRAN bearer configured in the user equipment is reconfigured, modified, and/or changed to the WLAN bearer using the RCC connection reconfiguration message, the user equipment may perform the following operations.

When the DRB adding/modifying configuration information includes the PDCP configuration information, the PDCP entity is reconfigured according to the PDCP configuration information.

When the DRB adding/modifying configuration information includes the RLC configuration information, the RLC entity is reconfigured according to the RLC configuration information.

The user equipment establishes the WLAN entity. The WLAN entity is configured or reconfigured according to the WLAN entity configuration information.

For another example, when the E-UTRAN bearer configured in the user equipment is reconfigured, modified, and/or changed to the WLAN bearer using the RCC connection reconfiguration message, the user equipment may perform the following operations.

When the DRB adding/modifying configuration information includes the PDCP configuration information, the PDCP entity is reconfigured according to the PDCP configuration information.

The RLC entity (or a specific function thereof, for example, an automatic repeat request (ARQ) or a retransmission function) is reconfigured to the WLAN entity (or a specific function thereof, for example, an automatic repeat request (ARQ) or a retransmission function).

For another example, the E-UTRAN bearer configured in the user equipment is reconfigured, modified, and/or changed to the WLAN bearer using the RCC connection reconfiguration message, the user equipment may perform the following operations.

The PDCP does not trigger the retransmission of the PDCP data (e.g. PDUs or SDUs) transmitted on the uplink. Alternatively, the PDCP does not trigger the retransmission of PDCU PDUs that the PDCP submitted to the RLC entity.

The RLC entity or the WLAN entity completes the transmission or retransmission of all pending data units, such as RLC SDUs or RLC PDUs.

For example, the RLC entity or the WLAN entity may complete the transmission or retransmission of all pending data units, such as RLC SDUs or RLC PDUs, using the WLAN carrier. In another example, the RLC entity or the WLAN entity may complete the transmission or retransmission of all pending PDCP PDUs using the WLAN carrier. In another example, for the uplink, the RLC entity or the WLAN entity transmits or retransmits PDCP PDUs received from the PDCP PDUs before the reconfiguration, modification, and/or change of the bearer. In addition, for the uplink, the RLC entity or the WLAN entity transmits or retransmits RLC SDUs or RLC PUDs received from the PDCP entity before the reconfiguration, modification, and/or change of the bearer. In addition, for the uplink, the RLC entity or the WLAN entity transmits or retransmits PDCP PDUs submitted by the PDCP entity before the reconfiguration, modification, and/or change of the bearer.

When a specific radio bearer is changed from a WLAN bearer to a WLAN bearer without a change in the data type of the radio bearer shall be considered. The operations of the user equipment and the base station in this case will be described as follows.

Reconfiguration, Modification, and Change of WLAN Bearer to WLAN Bearer

In some cases, in response to a change in WLAN APs, networks, SSIDs, BSSIDs, HESSIDs, and/or domain name lists, a WLAN bearer passing through a specific one of WLAN APs, networks, SSIDs, BSSIDs, HESSIDs, and/or domain name lists must be reconfigured, modified, and/or changed to a WLAN bearer passing through another one of WLAN APs, networks, SSIDs, BSSIDs, HESSIDs, and/or domain name lists. In this case, due to a change in WLAN APs, networks, SSIDs, BSSIDs, HESSIDs, domain name lists, and the like, data delivered from the PDCP entity to the corresponding WLAN entity may be lost. For radio bearers mapped to the AM LRC, when a WLAN bearer configured in the user equipment is reconfigured, modified, and/or changed to a WLAN bearer using an RCC connection reconfiguration message, it is required to be able to ensure lossless data transmission.

In this regard, the following methods may be used.

1) PDCP Reestablishment

When a WLAN bearer configured in the user equipment is reconfigured, modified, and/or changed to a WLAN bearer using an RCC connection reconfiguration message, the user equipment may perform the following operations.

The user equipment reestablishes the PDCP entity.

The WLAN entity can perform one or more operations among the following operations of:

Delivering, by a receiving side, PDCP PDUs, which can be delivered to the PDCP entity, to higher layers, when possible;

Discarding, by the receiving side, remaining data;

Discarding, by a transmitting side, data; and

Discarding control data.

When the PDCP reestablishment is performed as described above, for data lost during the process of changing the radio bearer, the user equipment transmits or retransmits PDCP SDUs, successful delivery of which has not been confirmed, due to PDCP reestablishment. Thus, lossless transmission may be performed. However, according to this method, even in the case of a bearer change without a change in the PDCP entity, complicated specific operations, such as resetting a header compression protocol, changing a security key, transmitting or retransmitting PDCP SDUs, and the like, must be performed, thereby increasing complexity and leading to delays.

2) PDCP Data Recovery

The PDCP data recovery operation can be performed while reconfiguring the PDCP entity or maintaining the PDCP entity without the above-described PDCP reestablishment.

For example, when the WLAN bearer is reconfigured, modified, and/or changed to a WLAN bearer using an RCC connection reconfiguration message, the user equipment may perform the following operations.

The user equipment recovers PDCP data previously submitted to the WLAN entity.

The WLAN entity can perform one or more operations among the following operations of:

Delivering, by a receiving side, PDCP PDUs, which can be delivered to the PDCP entity, to higher layers, when possible;

Discarding, by the receiving side, remaining data;

Discarding, by a transmitting side, data; and

Discarding control data.

In the PDCP data recovery procedure of the related art, all PDCP PDUs previously submitted to the reestablished AM RLC entity are retransmitted. Thus, when the WLAN bearer is changed to another WLAN bearer, the PDCP PDUs submitted to the previous WLAN entity must be retransmitted through a new WLAN network before a bearer change message is received (or the PDCP data recovery is performed).

When the radio bearer is configured to send a PDCP status report on an uplink by higher layers according to the PDCP data recovery procedure, the PDCP status report is compiled and then is submitted to the first PDCP PDU to be transmitted to lower layers.

When the PDCP data recovery for the uplink is performed in the user equipment, the base station must perform a reordering function for corresponding PDCP data. When the PDCP data recovery for a downlink is performed in the base station, the user equipment must perform a reordering function for corresponding PDCP data.

In the related art, the PDCP data recovery is only performed when a split bearer standardized in Rel-12 DC is changed (e.g. when the split bearer is changed to another split bearer without PDCP reestablishment or when the split bearer is changed to an MCG bearer without PDCP reestablishment).

In addition, in the related art, when the split bearer is configured in the user equipment, the reordering function is performed. In an example, when the PDCP entity is associated with two AM RLC entities in a DC situation, the reordering function is performed in the user equipment. In another example, when the split bearer is changed to another split bearer without PDCP reestablishment, the reordering function is performed. In addition, in the related art, the reordering function is used when the split bearer is changed to an MCG bearer without PDCP reestablishment in the user equipment (the PDCP entity is associated with one AM RLC entity after it was, according to the most recent reconfiguration, associated with two AM RLC entities without performing PDCP re-establishment).

Thus, the PDCP starts (e.g., initiates) the reordering function directly after receiving a DC split bearer configuration message and applies a reordering method, such as an RLC UM, using the established reordering timer (t-Reordering-r12). That is, all stored PDCP SDU(s) are delivered to higher layers for the reordering.

Thus, when the above-described WLAN bearer is reconfigured, modified, and/or changed to another WLAN bearer, when the PDCP data recovery is used, the reordering function may be operated together. The base station may instruct the user equipment using an RRC message to which information regarding (or information instructing) the configuration of the reordering timer designed for this purpose is added. The base station may perform the reordering function for this purpose.

Alternatively, when the above-described reordering function is not used, a downlink data receiving procedure provided by the PDCP may be used. When the above-described reordering function is not used, for the radio bearer mapped to the AM RLC, unless lower layer reestablishment is applied, PDCP SDUs or PDUs received by the PDCP are directly delivered to higher layers. That is, when the above-described reordering function is not used, PDCP data may be directly delivered to the higher layers without being reordered, since the RLC ensures in-sequence delivery. However, when the above-described reordering function is not used, for the radio bearer mapped to the AM RLC, PDCP reordering may be performed before delivery to the higher layers, since the lower layer reestablishment is associated with PDCP reestablishment, such as handover. However, since a change in the WLAN bearer is not accompanied by RLC reestablishment, when the reordering function of the related art is not used, the downlink data receiving procedure provided by the PDCP cannot be used.

Thus, when the PDCP data recovery is used in reconfiguring, modifying, and/or changing the above-described WLAN bearer to another WLAN bearer, the user equipment may perform reordering by improving the downlink data receiving procedure provided by the PDCP of the related art when the above-described reordering function is not used.

In an example, when a PDCP SDU or a PDCP PDU received by the PDCP is caused by a change from the WLAN bearer to another WLAN bearer (or the release of the WLAN entity or a specific operation of the WLAN entity), the reordering may be performed as follows:

elseif received PDCP SN=Last_Submitted_PDCP_RX_SN+1 or received PDCP SN=Last_Submitted_PDCP_RX_SN−Maximum_PDCP_SN:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

In another example, when the PDCP SDU or the PDCP PDU received by the PDCP is caused by a change from the WLAN bearer to another WLAN bearer (or the release of the WLAN entity or a specific operation of the WLAN entity), the reordering can be performed as follows:

deliver to upper layers in ascending order of the associated COUNT value:

all stored PDCP SDU(s) with consecutively associated COUNT value(s) starting from the COUNT value associated with the received PDCP PDU;

set Last_Submitted_PDCP_RX_SN to the PDCP SN of the last PDCP SDU delivered to upper layers;

As described above, when the user equipment and the base station transmit and receive data to and from each other using a specific radio bearer, the present disclosure proposes a specific reconfiguration method according to information regarding the bearer type of the specific radio bearer and in response to a change in the WLAN network. In particular, the procedure of changing an E-UTRAN bearer to a WLAN bearer or a WLAN bearer to an E-UTRAN bearer is performed without PDCP reestablishment to reduce unnecessary delays and data retransmissions. In addition, data may be retransmitted without being lost when the specific radio bearer is reconfigured.

A user equipment and a base station device that may perform all of the above-described operations according to embodiments of the present disclosure will be described briefly with reference to the drawings.

Figure 7:
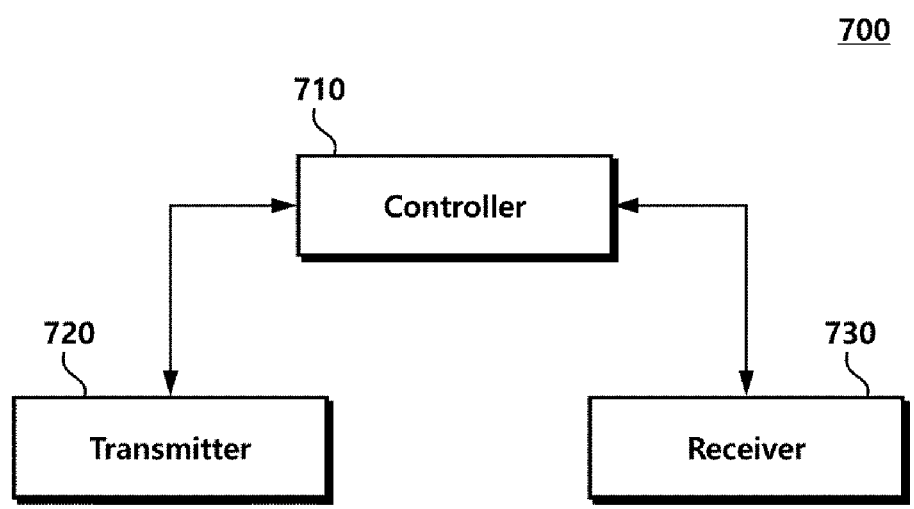
FIG. 7 illustrates a configuration of a user equipment according to an embodiment of the present disclosure.

FIG. 7 illustrates a configuration of user equipment according to an embodiment of the present disclosure.

Referring to FIG. 7, user equipment 700 reconfiguring a radio bearer includes: a receiver 730 receiving a higher layer signal including information for changing the data radio bearer type of a specific radio bearer configured to receive downlink data from a base station using only wireless resources of WLAN; and a controller 710 performing a PDCP data recovery procedure by a PDCP entity and performing a reordering procedure for the specific radio bearer by the PDCP entity, based on the information for changing the data radio bearer type of the specific radio bearer.

The receiver 730 may receive an RCC connection reconfiguration message, including the information for changing the data radio bearer type, from the base station. The information for changing the data radio bearer type of the specific radio bearer may include information for changing the specific radio bearer from a radio bearer type receiving downlink data using only wireless resources of WLAN to a radio bearer type receiving downlink data using only wireless resources of a base station.

In addition, the receiver 730 may receive a higher layer signal including the information for changing the data radio bearer type of the specific radio bearer configured to receive downlink data using only wireless resources of a base station. In this case, the information for changing the data radio bearer type of the specific radio bearer may include information for changing the specific radio bearer from a radio bearer type receiving downlink data using only wireless resources of a base station to a radio bearer type receiving downlink data using only wireless resources of WLAN.

In addition, the receiver 730 may further receive information for configuring a reordering timer used in performing the reordering procedure by the PDCP entity. The information for configuring the reordering timer may be received through higher layer signaling.

When the reordering procedure is performed and when reordering timer expires, the controller 710 may deliver all PDCP SDUs stored for the reordering to higher layers in the ascending order of associated count values.

In addition, when the reordering procedure is performed, the controller 710 may compile a PDCP status report, add the PDCP status report to PDCP PDUs, and deliver the PDCP PDUs to higher layers.

In addition, when a WLAN bearer is reconfigured to an E-UTRAN bearer, the controller 710 may perform all of the PDCP data recovery procedure and the reordering procedure as described above. When an E-UTRAN bearer is reconfigured to a WLAN bearer, the controller 710 may perform the reordering procedure along without performing the PDCP data recovery procedure.

In addition, the receiver 730 receives downlink control information, data, and messages from the base station through a corresponding channel. In addition, the controller 710 controls the overall operation of the user equipment due to configuration and reconfiguration, in which the base station required for the realization of the present disclosure, for example, adds, modifies, releases, and/or changes the radio bearer together with the user equipment by adding the WLAN carrier.

A transmitter 720 transmits uplink control information, data, and messages to the base station through a corresponding channel.

Figure 8:
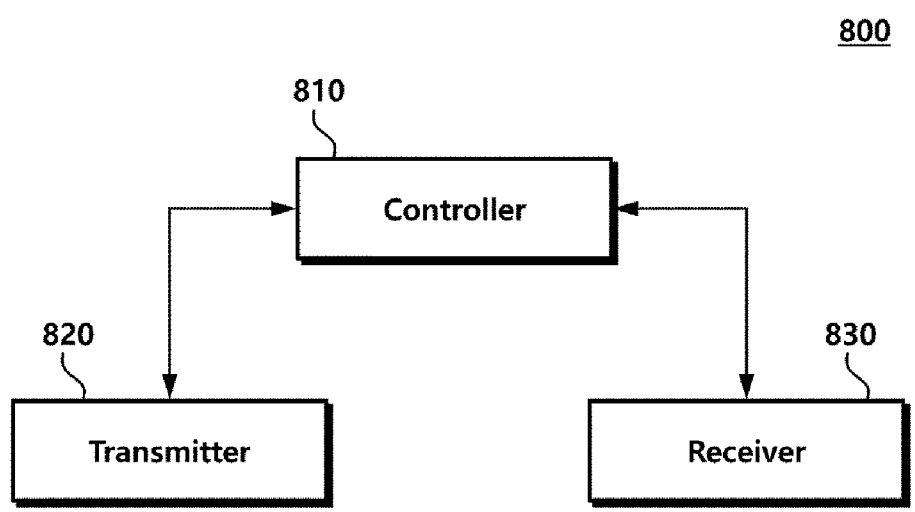
FIG. 8 illustrates a configuration of a base station according to an embodiment of the present disclosure.

FIG. 8 illustrates a configuration of a base station according to an embodiment of the present disclosure.

Referring to FIG. 8, a base station 800 includes a transmitter 820, a receiver 830, and a controller 810. The transmitter 820 transmits a higher layer signal including information for changing the data radio bearer type of a specific radio bearer configured to receive downlink data using only Wireless resources of WLAN. The receiver 830 receives a PDCP status report from the user equipment. The controller 810 retransmits, by a PDCP entity, PDCP PDUs or PDCP SDUs, which are not confirmed as successful delivered, based on the PDCP status report.

The transmitter 820 includes information for changing the data radio bearer type of the specific radio bearer. Here, the information for changing the data radio bearer type of the specific radio bearer may include information for changing the specific radio bearer from a radio bearer type receiving downlink data using only Wireless resources of WLAN to a radio bearer type receiving downlink data using only wireless resources of a base station. Alternatively, the information for changing the data radio bearer type of the specific radio bearer may include information for changing the specific radio bearer from a radio bearer type receiving downlink data using only wireless resources of a base station to a radio bearer type receiving downlink data using only Wireless resources of WLAN.

In addition, the transmitter 820 may transmit information for configuring a reordering timer to the user equipment, the reordering timer being used by the user equipment to perform a reordering procedure. In this case, the information for configuring the reordering timer may be transmitted through higher layer signaling (e.g. on an RRC message).

In addition, the controller 810 controls the overall operation of the base station required for the realization of the present disclosure due to configuration and/or reconfiguration, in which the base station, for example, adds, modifies, releases, and/or changes the radio bearer together with the user equipment by adding the WLAN carrier.

The transmitter 820 and the receiver 830 are used in transmitting and receiving signals, messages, and data, necessary for the realization of the above-described present disclosure, to and from the user equipment.

The standard contents or standard documents mentioned in the foregoing embodiments are omitted to simplify the description of the specification and shall be understood to be incorporated herein. Therefore, portions of the standard contents or the standard documents, added to the specification or described in the appended Claims, should be interpreted as falling within the scope of the present disclosure.

The foregoing descriptions and the accompanying drawings have been presented in order to explain the certain principles of the present disclosure. A person skilled in the art to which the present disclosure relates can make many modifications and variations by combining, dividing, substituting for, or changing the elements without departing from the principle of the present disclosure. The foregoing embodiments disclosed herein shall be interpreted as illustrative only but not as limitative of the principle and scope of the present disclosure. It should be understood that the scope of the present disclosure shall be defined by the appended Claims and all of their equivalents fall within the scope of the present disclosure.

The invention claimed is:

1. A method of reconfiguring a radio bearer by a user equipment, the method comprising:
receiving a higher layer signal including information for changing a data radio bearer type of one selected radio bearer configured to receive downlink data from a base station using only wireless local area network (WLAN) wireless resources;
performing, by a packet data convergence protocol (PDCP) entity, a PDCP data recovery procedure based on the information for changing the data radio bearer type of the one selected radio bearer; and
performing, by the PDCP entity, a reordering procedure for the one selected radio bearer,
wherein the information for changing the data radio bearer type of the one selected radio bearer includes information for changing the one selected radio bearer from a first radio bearer type receiving the downlink data using only the WLAN wireless resources to a second radio bearer type receiving the downlink data using only wireless resources of the base station and maintaining radio bearer types of the other radio bearers configured to receive downlink data and to transmit uplink data using one of the WLAN wireless resources and the wireless resources of the base station; and
wherein the PDCP data recovery procedure and the reordering procedure are performed by the PDCP entity when the data radio bearer type is changed from the first radio bearer type to the second radio bearer type based on the information for changing the data radio bearer type.

2. The method according to claim 1, wherein in the PDCP data recovery procedure, a PDCP status report is compiled and delivered on PDCP protocol data units to lower layers.

3. The method according to claim 1, wherein the higher layer signal further includes information for configuring a reordering timer used by the PDCP entity in the reordering procedure.

4. The method according to claim 1, wherein, in the reordering procedure, PDCP service data units of all of the downlink data, stored for reordering, are delivered to higher layers when a reordering timer expires.

5. A method of reconfiguring a radio bearer by a user equipment, the method comprising:
receiving a higher layer signal including information for changing a data radio bearer type of one selected radio bearer configured to receive downlink data from a base station using only wireless resources of the base station; and
starting, by a packet data convergence protocol (PDCP) entity, a reordering procedure for the one selected radio bearer based on the information for changing the data radio bearer type of the one selected radio bearer,
wherein the information for changing the data radio bearer type of the one selected radio bearer includes information for changing the one selected radio bearer from a first radio bearer type receiving the downlink data using only the wireless resources of the base station to a second radio bearer type receiving the downlink data using only wireless local area network (WLAN) wireless resources and maintaining radio bearer types of the other radio bearers configured to receive downlink data and to transmit uplink data using one of the WLAN wireless resources and the wireless resources of the base station; and
wherein the reordering procedure is performed by the PDCP entity when the data radio bearer type is changed from the first radio bearer type to the second radio bearer type based on the information for changing the data radio bearer type.

6. A method of reconfiguring a radio bearer of a user equipment by a base station, the method comprising:
transmitting, to the user equipment, a higher layer signal including information for changing a data radio bearer type of one selected radio bearer configured to receive downlink data using only wireless local area network (WLAN) wireless resources;
receiving a PDCP status report from the user equipment; and
retransmitting, by a packet data convergence protocol (PDCP) entity, PDCP protocol data units or PDCP service data units based on the PDCP status report wherein the PDCP protocol data unit or the PDCP service data units are data units not confirmed as successfully delivered,
wherein the information for changing the data radio bearer type of the one selected radio bearer includes information for changing the one selected radio bearer from a first radio bearer type receiving the downlink data using only the WLAN wireless resources to a second radio bearer type receiving the downlink data using only wireless resources of the base station and maintaining radio bearer types of the other radio bearers configured to receive downlink data and to transmit uplink data using one of the WLAN wireless resources and the wireless resources of the base station; and
wherein the user equipment is configured to perform, by a PDCP entity, a reordering procedure for the one selected radio bearer when the data radio bearer type is changed from the first radio bearer type to the second radio bearer type based on the information for changing the data radio bearer type.

7. The method according to claim 6, wherein the information for changing the radio bearer type of the one selected radio bearer further includes information for configuring a reordering timer used by the user equipment in the reordering procedure.

* * * * *